(12) United States Patent
Dalles et al.

(10) Patent No.: US 11,214,738 B2
(45) Date of Patent: Jan. 4, 2022

(54) OPTIMIZED THERMOLYSIS INSTALLATION AND METHOD FOR IMPLEMENTING SAME

(71) Applicant: ELYSE TECHNOLOGY, Aix en Provence (FR)

(72) Inventors: Philippe Dalles, Aix en Provence (FR); Jean-Paul Gourdin, Puyricard (FR)

(73) Assignee: ELYSE TECHNOLOGY, Aix en Provence (FR)

( * ) Notice: Subject to any disclaimer, the term of this patent is extended or adjusted under 35 U.S.C. 154(b) by 27 days.

(21) Appl. No.: 16/628,417

(22) PCT Filed: Jul. 3, 2018

(86) PCT No.: PCT/EP2018/067959
§ 371 (c)(1),
(2) Date: Jan. 3, 2020

(87) PCT Pub. No.: WO2019/007964
PCT Pub. Date: Jan. 10, 2019

(65) Prior Publication Data
US 2020/0208067 A1  Jul. 2, 2020

(30) Foreign Application Priority Data
Jul. 7, 2017 (EP) .................................. 17305889

(51) Int. Cl.
*C10B 27/00* (2006.01)
*C10B 53/00* (2006.01)
(Continued)

(52) U.S. Cl.
CPC ............ *C10B 27/00* (2013.01); *B09B 3/0083* (2013.01); *C10B 21/00* (2013.01); *C10B 53/00* (2013.01);
(Continued)

(58) Field of Classification Search
CPC ......... C10B 21/00; C10B 21/08; C10B 27/00; C10B 47/28–48; C10B 53/00
See application file for complete search history.

(56) References Cited

U.S. PATENT DOCUMENTS 4,465,556 A * 8/1984 Bowen .................... C10B 53/02
202/99
4,618,735 A  10/1986 Bridle et al.
(Continued)

FOREIGN PATENT DOCUMENTS

EP  0 140 811  5/1985
FR  2 937 331  4/2010
(Continued)

OTHER PUBLICATIONS

International Search Report, PCT/EP2018/067959, dated Sep. 10, 2018.

*Primary Examiner* — Renee Robinson
(74) *Attorney, Agent, or Firm* — Nixon & Vanderhye

(57) ABSTRACT

A waste thermolysis installation includes a first, drying, enclosure able to vacuum dry the incoming waste and a second, calcining, enclosure, able to perform a vacuum calcination treatment on the dried waste coming from the first enclosure, each enclosure including an external-heating system including a combustion chamber and a vacuum pump which makes it possible to maintain the vacuum in the enclosure and is connected to the enclosure by an extraction pipe, the installation being characterized in that it includes a pipe circulating gas coming from the second enclosure to the second enclosure through the system for the external heating of the second enclosure. Thermolysis method implementing the installation.

21 Claims, 1 Drawing Sheet

(51) Int. Cl.
  *B09B 3/00*    (2006.01)
  *C10B 53/07*   (2006.01)
  *C10B 57/10*   (2006.01)
  *F23G 5/027*   (2006.01)
  *F23G 5/04*    (2006.01)
  *C10B 21/00*   (2006.01)
  *F23G 5/46*    (2006.01)

(52) U.S. Cl.
  CPC .............. *C10B 53/07* (2013.01); *C10B 57/10* (2013.01); *F23G 5/027* (2013.01); *F23G 5/04* (2013.01); *F23G 5/46* (2013.01); *F23G 2201/303* (2013.01)

(56) References Cited

U.S. PATENT DOCUMENTS

| | | |
|---|---|---|
| 4,781,796 A | 11/1988 | Bridle et al. |
| 5,296,005 A | 3/1994 | Wolfe et al. |
| 5,466,383 A | 11/1995 | Lee |
| 2014/0110242 A1 | 4/2014 | Pehota et al. |
| 2016/0122674 A1* | 5/2016 | White .................... C10L 5/445 44/605 |

FOREIGN PATENT DOCUMENTS

| | | |
|---|---|---|
| GB | 2 539 447 | 12/2016 |
| WO | WO 00/75567 | 12/2000 |
| WO | WO 2011/007505 | 1/2011 |
| WO | WO 2011/160163 | 12/2011 |
| WO | WO 2012/156769 | 11/2012 |

* cited by examiner

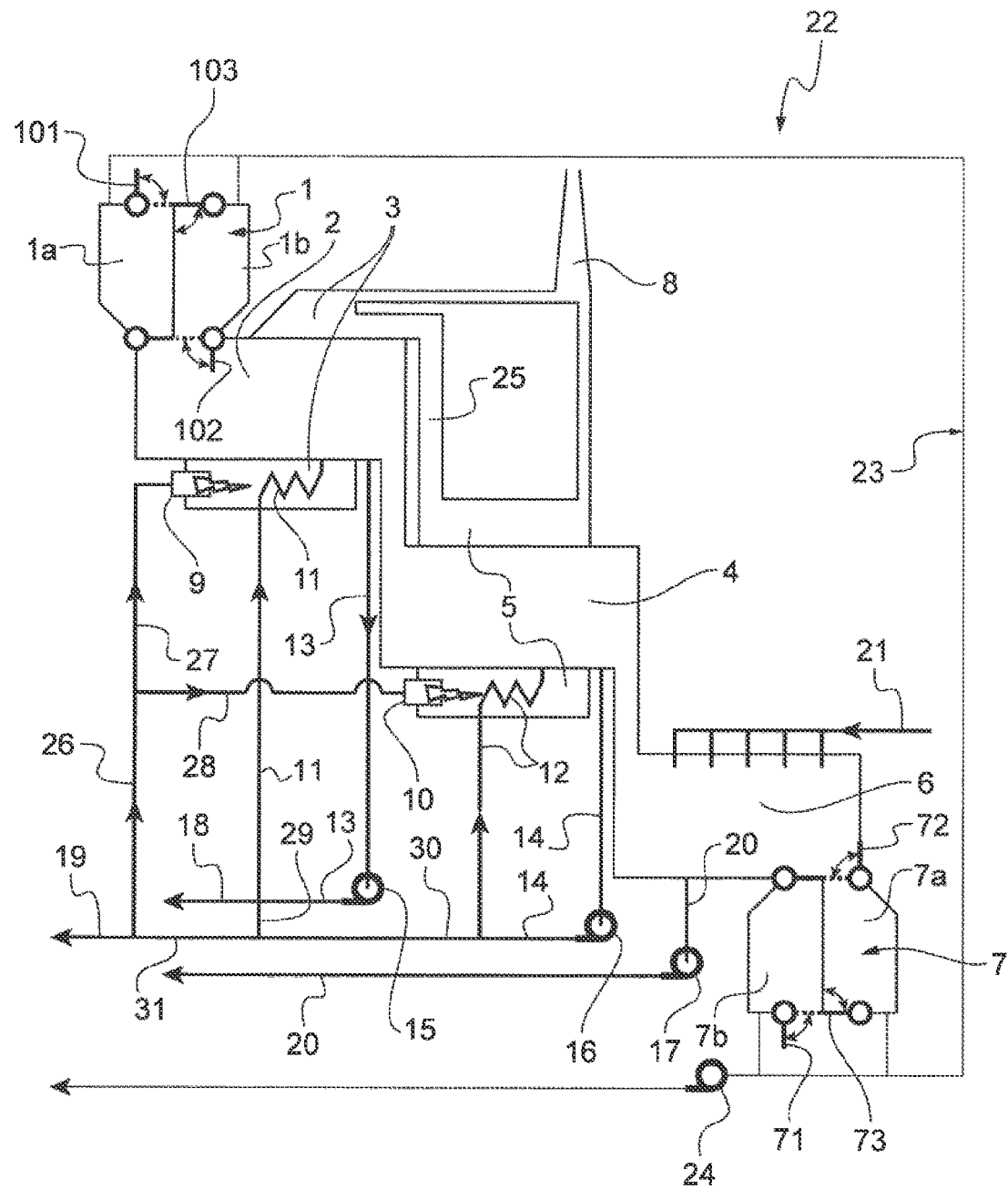

OPTIMIZED THERMOLYSIS INSTALLATION AND METHOD FOR IMPLEMENTING SAME

BACKGROUND OF THE INVENTION

Field of the Invention

The present invention relates to the general field of a thermolysis installation and a method for implementing said installation.

Description of the Related Art

Thermolysis is a heat treatment of waste in the absence of air. Thermolysis is, in fact, merely an application of the traditional technique of charcoal manufacture that has been adapted for waste.

The heat treatment of waste could be made through combustion but in that case in the presence of air. This gives rise to the drawback that the combustion gases (such as methane) that are still usable are evacuated with the smoke ($CO_2$, $N_2$), which reduces the profitability of the process.

The waste to treat is generally either products of organic chemistry (for example plastics, rubber, paints, etc.) or hydrocarbon compounds and/or natural products having a high proportion of carbon (for example wood, fabrics, plant matter, etc.)

In most cases, the waste to treat must be pre-treated before the thermolysis treatment to improve the thermolysis. This pre-treatment consists of drying it, or even of grinding it to homogenize it. The waste to treat is usually just dried.

In thermolysis, the waste is not burnt, but heated in the absence of air in a sealed vessel at medium temperature (180 to 400° C.), which leads to calcination.

In a conventional way, the heating of the vessel is in most cases carried out from the outside, in which case the vessel is placed under a vacuum (a reduced pressure). The heat and the absence of air give rise to decomposition of the organic matter into two parts: a solid component and a hot gas.

The solid component is a carbonized residue which contains mineral matter which was unable to be decomposed by the heat (ferrous and non-ferrous metals, glass, ceramics, gravel, etc.), and, above all, carbon. This carbonized residue leaves the kiln at approximately 300-450° C., and must be cooled. The cooling may be carried out under nitrogen, in which case it is followed by scrubbing. Preferably, this cooling may be carried out by scrubbing with water, which advantageously enables some of the chlorine, if present, to be captured. The cooling is most often followed by a first sorting operation to eliminate the glass and inert matter (gravel, ceramics), then possibly by second sorting operation to separate the ferrous and non-ferrous metals. When freed from some of the mineral matter (glass, gravel) and the metals, the final residue is solely constituted by carbon and is similar to charcoal.

A release of gas occurs during thermolysis. This gas consists of a condensable fraction, that is to say which can be liquefied and thus transform into oil (spirit vapors, water vapors, etc.) and a non-condensable fraction, that is to say which remains in the gaseous state at the temperatures considered (hydrogen, methane, carbon monoxide, hydrocarbons, etc.). This oil may serve as a combustible for example in a combustion chamber. The gas which escapes generally from the top of the thermolysis vessel, mixed with dust, may then be treated conventionally: dust removal then combustion. In general, this gas is preferentially burnt. This makes it possible to minimize its on-site storage. Indeed, this storage is usually problematic, since, in particular, it requires a certain storage capacity for these gases under pressure and poses safety problems (since these gases are combustible).

Thus, according to the known techniques, a thermolysis installation has the drawback of a high consumption of energy due to the heating, to the drying of the products to treat, or even dilution of the combustible products arising from the thermal decomposition with the smoke from combustion.

SUMMARY OF THE INVENTION

The invention concerns a thermolysis installation, mitigating the drawbacks referred to above of the installations of the state of the art.

Thus, according to a first aspect, the invention concerns an installation for thermolysis of waste comprising at least two vessels, that is to say a drying first vessel and a calcining second vessel, each of these two vessels being able to operate under a vacuum, the first vessel being able to dry the incoming waste and the second vessel being able to perform calcination treatment of the dried waste from the first vessel, each of the two vessels, for drying and calcining, comprising a system for external heating having at least one combustion chamber, and at least one vacuum pump making it possible to maintain the vacuum in said vessel and which is linked to said vessel by an extraction pipe, Said installation being characterized in that it comprises at least one pipe for circulating gas from the second vessel to the second vessel through the system for external heating of the second vessel.

Advantageously according to the invention, when implemented the installation enables a substantial saving in energy consumption and the provision of gas from the exterior since it makes it possible to use, for the calcining second vessel, recycled gases, which are combustible gases, without the presence either of air or oxygen from the air, which makes it possible to maintain the internal atmosphere of the vessels at reduced pressure and without air. This recycling does not deteriorate the calorific power of the combustible thermolysis gases since these gases have the same composition between the outlet of the vessel and their recycling in the vessel.

Advantageously, the two vessels have differentiated functions and are independent, while operating in parallel, which notably facilitates access for maintenance of the equipment of rotating machine type.

According to the invention, it is not necessary to have available a specific heating system on the pipe for circulating: the heating system of the second vessel is advantageously used.

By "through" or "passes through" is meant according to the invention that there is no direct contact (and thus no exchange of content) with the interior of the device.

According to a preferred embodiment, the pipe for circulating gas from the second vessel to the second vessel comprises multiple outlet apertures in the second vessel.

Advantageously, this makes it possible to promote the reaction of calcination or pyrolysis which occurs in said second vessel.

According to one embodiment, the heating system may be supplied by boiler exhaust, gas turbine exhaust or steam turbine exhaust.

The vacuum pump or pumps advantageously make it possible to generate a dynamic vacuum, without interruption of vacuum, without a lock and without a transfer system. The vacuum pump may be common to the two vessels.

Preferably, the pipe for circulating gas from the second vessel to the second vessel passes through the combustion chamber of the second vessel.

In this case, the installation advantageously enables recycling without cooling and without loss of flow rate: the fraction of gas from the second vessel is heated by the combustion chamber before returning to the second vessel.

According to one embodiment, which may or may not be independent of the preceding embodiment, the installation further comprises at least one pipe for circulating gas from (or extracted from) the second vessel to the first vessel, preferably through the heating system of said first vessel. Preferably, the pipe for circulating gas from the second vessel to the first vessel passes through the combustion chamber of the first vessel.

According to one embodiment, which may or may not be independent of the preceding embodiments, the installation further comprises at least one pipe for circulating gas from (or extracted from) the first vessel to the first vessel, preferably through the heating system of said first vessel. Preferably, the pipe for circulating gas from the first vessel to the first vessel passes through the combustion chamber of the first vessel.

In all cases, the portion of pipe for circulating gas, that passes through the combustion chamber is generally of coil form, which makes it possible to increase the time of presence of the gas in said pipe portion and thus to heat it, such that, on implementation of the installation, the temperature on its recycling in the vessel is greater, generally by at least 50° C., than the temperature in the vessel. Furthermore, the gases recycled in the vessel are generally at a slightly greater pressure than atmospheric pressure and is thus sucked by the vacuum present in the vessel.

The installation according to the invention may further comprise at least one evacuation pipe for part of the gases from the first vessel and/or at least one evacuation pipe for part of the gases from the second vessel. (By "A and/or B" is meant, according to the invention, "A, or B, or A and B").

This enables the proper operation of the installation and especially to ensure the material balance. In other words, on thermolysis implementation of the installation, the recycling of the gases from the two vessels is generally not complete.

It is to be noted in this connection that the presence of water vapor in the gases from the first vessel and recycled therein generally does not pose any problem for the operation of the first vessel. This is because it is previously evacuated by passage within a cooling system (such as a scrubber) within which the condensation of the water enables the separation of the combustible gases which are recycled in the first vessel.

By "passage within a device", is meant according to the invention that there is no direct contact with the interior of the device.

The combustion chamber of the first vessel generally comprises a burner supplied with a combustible so as to produce heat. This combustible may comprise, and preferably consist of, at least a condensed portion of gas from the second vessel. In general, it is a condensed hydrocarbon portion of said gas.

The combustion chamber of the second vessel generally comprises a burner supplied with a combustible so as to produce heat. This combustible may comprise, and preferably consist of, at least some gas from the second vessel. In general, it is a condensed hydrocarbon portion of said gas.

To that end, according a variant of the invention, which may or may not be independent of the preceding embodiment or embodiments, the installation further comprises a supply pipe of at least one of the two combustion chambers by at least one diverting pipe connected, directly or indirectly, to the pipe for circulating gas from the second vessel to the second vessel.

It is also possible for the combustion chamber of the first vessel not to comprise a burner. As a matter of fact, the presence of the burner is not required in the combustion chamber of the first vessel if the hot gases from the second vessel suffice to heat the first vessel.

According to a variant of the invention, which may or may not be independent of the preceding embodiment or embodiments, the installation further comprises at least one communication pipe between the combustion chamber of the first vessel and the combustion chamber of the second vessel. In this case, it is generally not necessary to put the burner of the combustion chamber of the first vessel into operation for the combustion chamber to fulfill its role as heating system of the first vessel.

According to a preferred embodiment of the invention, which may or may not be independent of the preceding embodiment or embodiments, the installation further comprises a cooling third vessel, able to operate under a vacuum and able to cool the solid residues from the second vessel.

According to a preferred variant, the installation then further comprises a lock for introduction (or entry) of incoming waste into the first vessel and/or, preferably and, a lock for exit of the cooled solid residues from the third vessel, each of the locks being linked to at least one vacuum pump. In case both locks are present, each of the locks is connected to the same vacuum pump.

Advantageously, this makes it possible to use a single vacuum pump for both locks, the opening of the locks generally being carried out at particular times and independently.

According to the invention, the three vessels advantageously have differentiated functions and are independent, while operating in parallel, which notably facilitates access for maintenance of the equipment of rotating machine type.

According to a second aspect, the invention also relates to a thermolysis process for implementation of the installation according to the invention, said installation comprising at least two successive vessels, that is to say a drying first vessel and a calcining second vessel, each of the two vessels, for drying and calcining, comprising a system for external heating comprising at least one combustion chamber, and at least one vacuum pump making it possible to maintain the vacuum in said vessel by extraction of gas from the vessel, Said process being such that incoming waste is introduced into the drying first vessel operating under a vacuum and dried waste from the first vessel is introduced into the calcining second vessel operating under a vacuum, Said process being characterized in that it comprises at least one instance of recycling gas from the second vessel to the second vessel after heating through the system for external heating of the second vessel.

According to the invention, heating of the recycled gas is not carried out in the second vessel: the heating is advantageously carried out by the heating system of the second vessel.

According to a preferred embodiment, the recycled gas in the second vessel is re-injected into said vessel at multiple locations of the second vessel.

Advantageously, this makes it possible to promote the reaction of calcination or pyrolysis which occurs in said second vessel.

Preferably, said heating is carried out by passage within the combustion chamber of said second vessel.

In this case, the process advantageously enables recycling without cooling and without loss of flow rate: the fraction of recycled gas is heated by the combustion chamber before returning to the second vessel.

Preferably, according to one embodiment of the invention, gas from the second vessel is recycled to the first vessel, possibly after heating through the system for external heating of said first vessel. Preferably, said heating is carried out by passage within the combustion chamber of the first vessel.

In practice, the vacuum in the first vessel is generally from 0.3 to 0.5 bar (30 to 50 MPa). The vacuum in the first vessel enables the heated gas, at greater pressure than atmospheric pressure on exiting the vacuum pump, to be sucked by the vacuum present in the vessel. To initiate the drying, heating is commenced using gas stored in a tank before the process produces gas. It is also possible to use recycling of the gases from the second vessel in the first vessel, which enables 100° C. to be exceeded. The temperature on exiting the first vessel is comprised between 100 and 120° C. By passing through a coil in the combustion chamber, the temperature of the gas to recycle from the second vessel into the first vessel, when there is recycling, can attain 300° C.

In practice, the vacuum in the second vessel is generally from 0.3 to 0.5 bar (30 to 50 MPa). The vacuum in the second vessel enables the heated gas, at greater pressure than atmospheric pressure on exiting the vacuum pump, to be sucked by the vacuum present in the vessel. To initiate the calcination, a temperature of more than 180° C. is required in the second vessel. In operation, the temperature on exiting the second vessel is comprised between 250 and 400° C. On passing through a coil in the combustion chamber, the temperature of the gas to recycle in the second vessel can attain 400° C.

According to one embodiment of the invention, which may or may not be independent of the preceding embodiment, at least one instance of recycling is carried out of the gas from the first vessel to the first vessel after heating through the system for external heating of the first vessel. Preferably, said heating is carried out by passage within the combustion chamber of the first vessel.

According to one embodiment of the invention, which may or may not be independent of the preceding embodiments, at least one of the two combustion chambers of the first vessel and of the second vessel is supplied by at least part of the gases from the first vessel and/or from the second vessel, preferably from the second vessel. Preferably, said part of the gases is pre-treated before supplying the combustion chamber or chambers. Such pre-treatment may comprise a treatment for removing water, for example a condensation operation. Such pre-treatment may comprise passage within a cooling system such as a scrubber.

However, it is also possible to supply said combustion chambers with some of the smoke from a boiler for exploitation of the combustibles. Such a boiler, present optionally on the side containing the thermolysis installation, is typically a steam boiler which generally operates on the basis of combustibles (charcoal, oils and residual gas) from the process and which can produce electricity. It produces smoke at approximately 700° C., which can be used in the combustion chambers.

According to one embodiment of the invention, which may or may not be independent of the preceding embodiments, the solid residues from the second vessel are cooled in a cooling third vessel operating in a vacuum. Preferably, said cooling is scrubbing with water, generally carried out in a scrubber.

Advantageously, this makes it possible to avoid self-combustion of these solids during their return to the open air, before the introduction of these solids, generally at a temperature below 60° C., for possible sorting. Furthermore, the water, if used, enables recovery of some of the pollutants that would be present in those solid residues, such as chlorine and/or heavy metals.

BRIEF DESCRIPTION OF THE DRAWINGS

The disclosure of the invention will now be continued with the detailed description of an embodiment, given below by way of non-limiting example, with reference to the accompanying drawing. In this:

The drawing FIGURE is a diagrammatic cross-section view of a thermolysis installation according to the invention.

DESCRIPTION OF THE PREFERRED EMBODIMENTS

The drawing FIGURE illustrates an installation 22 for waste thermolysis comprising a drying first vessel 2 and a calcining second vessel 4. In this FIGURE, the directions of circulation of the fluids are indicated by arrows. Unless expressly indicated otherwise, the fact that two pipes meet in the drawing FIGURE means that those pipes are connected.

The first vessel 2 is able to operate under a vacuum and is able to dry the incoming waste, for its subsequent treatment by thermolysis in the calcining vessel 4. It comprises a system for external heating consisting of a combustion chamber 3, comprising a burner 9, and a vacuum pump 15 making it possible to maintain the vacuum in said vessel 2 and which is connected to said vessel 2 by an extraction pipe 13. This combustion chamber 3 comprises a wall forming a double shell surrounding the vessel 2. According to the invention, the installation 22 comprises a pipe for circulating (13; 29; 11) consisting of the extraction pipe 13 enabling the passage by the vacuum pump 15, said pipe 13 communicating with a pipe 18 enabling evacuation of the gases, a pipe 29, and a pipe 11 for circulating gas to the first vessel 2. The pipe 11 passes through the heating system of said first vessel 2, that is to say through the combustion chamber 3. The pipe 11 at that location is of coil form which is configured to increase the time of presence of the gas in the pipe 11 within the combustion chamber 3. The gases that are not recycled in the first vessel 2 may be evacuated by the evacuation pipe 18.

The second vessel 4 is able to operate under a vacuum and is able to perform calcination treatment of the dried waste from the first vessel 2. It comprises a system for external heating consisting of a combustion chamber 5, comprising a burner 10, and a vacuum pump 16 making it possible to maintain the vacuum in said vessel 4 and which is connected to said vessel 4 by an extraction pipe 14. This combustion chamber 5 comprises a wall forming a double shell surrounding the vessel 4. According to the invention, the installation 22 comprises a pipe for circulating (14,12) consisting of the extraction pipe 14 enabling the passage by the vacuum pump 16, said pipe 14 dividing into a pipe 30, and a pipe 12 for circulating gas to the second vessel 4. The pipe 12 passes through the heating system of said second vessel 4, that is to say through the combustion chamber 5. The pipe 12 at that location is of coil form which is configured to increase the time of presence of the gas in the pipe 12 within the combustion chamber 5. The gases that are not recycled in the second vessel 4 may be evacuated by a pipe 19 enabling evacuating of the gases, the pipe 19 being connected to the pipe 14 by the pipe 30 then a pipe 31.

According to a variant represented in the drawing FIGURE, the pipe 31 divides into pipe 19 and a pipe 26. The pipe 26 divides into the pipes 27 and 28 (which is not connected to pipes 11 and 13), respectively making it possible to provide part of the evacuated gases to the respective burners 9 and 10 of the respective combustion chambers 3 and 5. These gases typically undergo pretreatment (not shown), among which is condensation and elimination of water, before supplying the burners 9 and 10. At the time of the operation of the installation 22, it is possible that just one of the burners 9 and 10 is supplied by at least some of the gas from the second vessel 4.

According to a variant not shown, it is also possible to provide a supply line to at least one of the burners 9 and 10 from an evacuation pipe 18 linked to the first vessel.

According to another variant, not shown, it is possible for the combustion chamber 3 not to comprise a burner 9, the combustion chamber 3 being solely heated by the provision of gas from the second vessel 4.

According to the invention, the installation 22 further comprises a pipe (14, 30, 29, 11) for circulating gas from the second vessel 4 to the first vessel 2 through the heating system, that is to say the combustion chamber 3, of said first vessel 2. This pipe for circulating is formed by the pipe 14, by the pipe 30 (which divides into the pipe 31 and a pipe 29), by the pipe 29 and by the pipe 11.

It is arranged for the combustion smoke from the combustion chambers 3 and 5 to be evacuated by a chimney 8. According to a variant represented in the drawing FIGURE, the combustion chambers 3 and 5 are linked by a communication pipe 25.

The installation 22 further comprises a third vessel 6 for cooling by scrubbing with water, able to operate under a vacuum and able to cool the solid residues from the second vessel 4.

The cooling vessel 6 is supplied by a cooling circuit 21, able to use water, which comes out from a multiplicity of jets in the vessel 6. The vacuum is maintained in the vessel 6 by a vacuum pump 17, which is able to evacuate the gases thus extracted by an evacuation pipe 20. The water vapor is condensed and evacuated by an evacuation pipe (not shown).

The installation 22 further comprises an entry lock 1, consisting of two sub-parts 1a and 1b and three valves 101, 102 and 103. The combination of movements of the valves 101, 102 and 103 enables the lock 1 to operate. In a first phase, the incoming waste (not shown) is introduced from the exterior of the installation 22 into a first sub-part 1a of the lock 1, under atmospheric pressure, by the opening of the valve 101, while the other sub-part 1b of the lock 1 is isolated from the exterior by the closing of the valve 103. The valve 102 is closed, insolating the vessel 2 from the lock 1. In a second phase, the valve 101 is closed and the waste is transferred into the second sub-part 1b of the lock 1, under reduced pressure, by opening the valve 103. Lastly, in a third phase, the opening of the valve 102 enables the entry of the waste into the vessel 2. In the case represented in the drawing FIGURE, the valves 101 and 102 are open and the valve 103 is closed.

The installation 22 further comprises an exit lock 7, consisting of two sub-parts 7a and 7b and three valves 71, 72 and 73. The combination of movements of the valves 71, 72 and 73 enables the lock 7 to operate. In a first phase, the cooled solid residues (not shown) are taken out from the vessel 6 to a first sub-part 7a of the lock 7, under reduced pressure, by the opening of the valve 72, while the other sub-part 7b of the lock 7 is isolated from the vessel 6 by the closing of the valve 73. The valve 71 is closed, isolating the lock 7 from the exterior. In a second phase, the valve 72 is closed and the solid residues are transferred into the second sub-part 7b of the lock 7, under atmospheric pressure, by opening the valve 73. Lastly, in a third phase, the opening of the valve 71 enables the exit of the residues to the exterior of the installation 22. In the case represented in the drawing FIGURE, the valves 71 and 72 are open and the valve 73 is closed.

A vacuum line 23 may be formed by a vacuum pump 24, linking the locks 1 and 7. The gases extracted for maintaining the vacuum are extracted by the vacuum pump 24.

The full or partial implementation of the installation 22 carries out a thermolysis method according to the invention, as used in the following two example embodiments. The installation enables implementation of different embodiments of the invention as described above. In the examples, two embodiments are used, described below. These embodiments partly use the installation 22 described above, in particular regarding the recycling of the combustible gases from the second vessel 4, and possibly regarding the cooling of the solid residues from the second vessel 4.

According to this thermolysis method, incoming waste is introduced, via the lock 1, into the drying first vessel 2, operating under a vacuum, then the dried waste from the first vessel 2 is introduced into the second vessel 4, operating under a vacuum. Next the solid residues from the second vessel 4 are possibly introduced into the third vessel 6, operating under a vacuum. Lastly, the cooled solid residues are possibly extracted from the vessel 6 via the lock 7.

Gas is recycled, via the pipes 14 then 12, from the second vessel 4 to the second vessel 4, through the combustion chamber 5 of the second vessel 4.

Gas may be recycled, via the pipes 13 then 11, from the first vessel 2 to the first vessel 2, through the combustion chamber 3 of the first vessel 2.

Gas may be recycled, via the pipes 14 then 30 then 29 then 11, from the second vessel 2 to the first vessel 2, through the combustion chamber 3 of the first vessel 2.

The two combustion chambers 3 and 5 of the first vessel 2 and second vessel 4 are supplied with at least part of the gases from the second vessel 4, via the pipes 26, 27 and 28.

According to a first example embodiment, three vessels 2, 4 and 6 each have an inside diameter of approximately 2 m and a length of approximately 6 m The installation 22 comprising the three vessels has a treatment capacity of approximately 10 000 tonnes per year according to the type of waste. The smoke 8 enables an electrical unit of approximately 5 MW to operate. From 5 to 15 of the combustibles serves for the actual calcination method.

The operating conditions of the method are as follows:
the temperature in the drying vessel 2 is approximately 100° C.;
the temperature in the calcining vessel 4 is approximately 180 to 400° C.;
the temperature of the combustion smoke in the combustion chambers 3 and 5 is approximately 1200° C.; and
the temperature of the combustion smoke in the chimney 8 is approximately 200 to 400° C.

In practice, 1000 kg of products to treat, according to two different cases, were introduced into the first vessel 2 and gave rise:

either to 300 kg and 240 kg of solids (charcoals), 130 kg of oils and 100 kg of gases where the products to treat were household garbage;

or to 30 kg and 280 kg of solids (charcoals), 380 kg of oils and 150 kg of gases where the products to treat were tires.

According to a second example embodiment, 500 kg of products to treat (household garbage), at 30% moisture content, were treated in two vessels, i.e. the drying vessel (first vessel) and the calcining vessel (second vessel). As a matter of fact, in this case, cooling is carried out in the calcining vessel after the calcining.

The heating on starting up was carried out with supplementary gas (mains gas). The gases extracted by a liquid-ring pump were kept at approximately 100° C. for as long as the products were not dry. After passage within the second vessel, the temperature of the gases rose, up to 250° C. on average, after a heating period of 45 minutes. The extracted gas was used as a combustible for the method. Approximately 70 kg of oil, 120 kg of charcoal and 100 kg of inert matter comprising metals and minerals was recovered. In the absence of oxygen, the metals were not corroded.

The invention claimed is:

1. An installation (22) for thermolysis of waste comprising:
   at least two vessels (2,4), said at least two vessels (2, 4) including a drying first vessel (2) and a calcining second vessel (4),
   each of the at least two vessels (2,4) being able to operate under a vacuum,
   the drying first vessel (2) being able to dry incoming waste and the calcining second vessel (4) being able to perform calcination treatment of the dried waste from the first vessel (2),
   a first external heating system comprising a first combustion chamber (3) that external heats the drying first vessel (2), first external heating system being external to the drying first vessel (2),
   a second external heating system comprising a second combustion chamber (5) that external heats the calcining second vessel (4), the second external heating system being external to the calcining second vessel (4),
   a first extraction pipe (13) connected to the drying first vessel (2),
   a second extraction pipe (14) connected to calcining second vessel (4),
   at least one vacuum pump (15,16) connected by the first and second extraction pipes to the at least two vessels (2, 4), the at least one vacuum pump (15, 16) operative to maintain the vacuum in the at least two vessels (2,4), and
   at least one circulating pipe (12) connected to a discharge side of said at least one vacuum pump (15, 16) and passing through second combustion chamber (5) that external heats the calcining second vessel (4), the at least one circulating pipe (12) having a form of a coil within the second combustion chamber (5),
   wherein the second extraction pipe (14) is connected, via said at least one vacuum pump (15, 16), to the at least one circulating pipe (12) for circulating gas from the calcining second vessel (4) back to the calcining second vessel (4) through the second combustion chamber (5) of the second external heating system for external heating (5) of the calcining second vessel (4), the at least one circulating pipe (12) having the form of a coil within the second combustion chamber (5) increasing a time of presence of the gas within the second combustion chamber (5) to further heat the gas in the second combustion chamber (5).

2. The thermolysis installation (22) according to claim 1, further comprising at least a second circulating pipe (30, 29, 11) connected to a discharge side of said at least one vacuum pump (15, 16), the at least a second pipe (30, 29, 11) for circulating gas from the calcining second vessel (4) to the drying first vessel (2).

3. The thermolysis installation (22) according to claim 2, wherein the at least a second pipe (30, 29, 11) passes through the combustion chamber (3) of the drying first vessel (2).

4. The installation (22) according to claim 3, wherein,
   the first external heating system comprises a first burner,
   the second external heating system comprises a second burner, and
   further comprising at least one supply pipe (27, 28) connected to the discharge side of said at least one vacuum pump (15, 16), the least one supply pipe (27, 28) supplying evacuated gas from the calcining second vessel (4) to the first burner and the second burner.

5. The installation (22) according to claim 2, wherein,
   the first external heating system comprises a first burner,
   the second external heating system comprises a second burner, and
   further comprising at least one supply pipe (27, 28) connected to the discharge side of said at least one vacuum pump (15, 16), the least one supply pipe (27, 28) supplying evacuated gas from the calcining second vessel (4) to the first burner and the second burner.

6. The thermolysis installation (22) according to claim 1, further comprising at least a third circulating pipe (13, 11) for circulating gas from the drying first vessel (2) to the drying first vessel (2), the at least a third circulating pipe (13, 11) passing through the combustion chamber (3) of the drying first vessel (2).

7. The installation (22) according to claim 6, wherein,
   the first external heating system comprises a first burner,
   the second external heating system comprises a second burner, and
   further comprising at least one supply pipe (27, 28) connected to the discharge side of said at least one vacuum pump (15, 16), the least one supply pipe (27, 28) supplying evacuated gas from the calcining second vessel (4) to the first burner and the second burner.

8. The installation (22) according to claim 1, wherein,
   the first external heating system comprises a first burner,
   the second external heating system comprises a second burner, and
   further comprising at least one supply pipe (27, 28) connected to the discharge side of said at least one vacuum pump (15, 16), the least one supply pipe (27, 28) supplying evacuated gas from the calcining second vessel (4) to the first burner and the second burner.

9. The installation (22) according to claim 1, further comprising at least one communication pipe (25) between the first combustion chamber (3) of the drying first vessel (2) and the second combustion chamber (5) of the calcining second vessel (4).

10. The thermolysis installation (22) according to claim 1, further comprising a third vessel (6) for cooling, able to operate under a vacuum and able to cool solid residues from the calcining second vessel (4).

11. The installation (22) according to claim 10, further comprising a further vacuum pump (24) and a lock (1) for introduction of the incoming waste into the drying first vessel (2) and/or a lock (7) for exit of the cooled solid residues from the third vessel (6), each of the locks (1, 7) being connected to the further vacuum pump (24).

12. A thermolysis method for implementing the installation (22) according to claim 1, said thermolysis method comprising:
    introducing waste into the drying first vessel (2) operating under a vacuum and then introducing the dried waste from the drying first vessel (2) into the calcining second vessel (4) operating under a vacuum, and
    recycling gas from the calcining second vessel (4) to the calcining second vessel (4) after heating the gas through the second external heating system (5).

13. The thermolysis method according to claim 12, wherein gas from the calcining second vessel (4) is recycled (30, 29, 11) to the drying first vessel (2).

14. The thermolysis method according to claim 12, wherein said heating through the second external heating system is carried out by passage within the second combustion chamber (5).

15. The thermolysis method according to claim 12, wherein at least one of the first and second combustion chambers (3, 5) is supplied (27, 28) by at least part of the gases from the drying first vessel (2) and/or from the calcining second vessel (4).

16. The thermolysis method according to claim 15, wherein said part of the gases are pre-treated before supplying the at least one of the first and second combustion chamber.

17. The thermolysis method according to claim 12, wherein solid residues from the calcining second vessel (4) are cooled in a cooling third vessel (6) operating in a vacuum.

18. An installation (22) for thermolysis of waste comprising:
    at least two vessels (2,4), said at least two vessels (2, 4) including a drying first vessel (2) and a calcining second vessel (4),
    each of the at least two vessels (2,4) being able to operate under a vacuum,
    the drying first vessel (2) being able to dry incoming waste and the calcining second vessel (4) being able to perform calcination treatment of dried waste from the first vessel (2),
    a first external heating system comprising a first combustion chamber (3) that external heats the drying first vessel (2),
    a second external heating system comprising a second combustion chamber (5) that external heats the calcining second vessel (4),
    a first extraction pipe (13) connected to the drying first vessel (2),
    a second extraction pipe (14) connected to calcining second vessel (4),
    at least one vacuum pump (15,16) connected by the first and second extraction pipes to the at least two vessels (2, 4), the at least one vacuum pump (15, 16) operative to maintain the vacuum in the at least two vessels (2,4),
    at least one circulating pipe (12) connected to a discharge side of said at least one vacuum pump (15, 16),
    wherein the second extraction pipe (14) is connected, via said at least one vacuum pump (15, 16), to the at least one circulating pipe (12) for circulating gas from the calcining second vessel (4) back to the calcining second vessel (4) through the second combustion chamber (5) of the second external heating system for external heating (5) of the calcining second vessel (4), and
    at least a second circulating pipe (30, 29, 11) connected to a discharge side of said at least one vacuum pump (15, 16), the at least a second pipe (30, 29, 11) for circulating gas from the calcining second vessel (4) to the drying first vessel (2),
    wherein the at least a second pipe (30, 29, 11) passes through the combustion chamber (3) of the first vessel (2).

19. An installation (22) for thermolysis of waste comprising:
    at least two vessels (2,4), said at least two vessels (2, 4) including a drying first vessel (2) and a calcining second vessel (4),
    each of the at least two vessels (2,4) being able to operate under a vacuum,
    the drying first vessel (2) being able to dry incoming waste and the calcining second vessel (4) being able to perform calcination treatment of dried waste from the first vessel (2),
    a first external heating system comprising a first combustion chamber (3) that external heats the drying first vessel (2),
    a second external heating system comprising a second combustion chamber (5) that external heats the calcining second vessel (4),
    a first extraction pipe (13) connected to the drying first vessel (2),
    a second extraction pipe (14) connected to calcining second vessel (4),
    at least one vacuum pump (15,16) connected by the first and second extraction pipes to the at least two vessels (2, 4), the at least one vacuum pump (15, 16) operative to maintain the vacuum in the at least two vessels (2,4),
    at least one circulating pipe (12) connected to a discharge side of said at least one vacuum pump (15, 16),
    wherein the second extraction pipe (14) is connected, via said at least one vacuum pump (15, 16), to the at least one circulating pipe (12) for circulating gas from the calcining second vessel (4) back to the calcining second vessel (4) through the second combustion chamber (5) of the second external heating system for external heating (5) of the calcining second vessel (4), and
    at least one communication pipe (25) between the first combustion chamber (3) of the drying first vessel (2) and the second combustion chamber (5) of the calcining second vessel (4).

20. An installation (22) for thermolysis of waste comprising:
    at least two vessels (2,4), said at least two vessels (2, 4) including a drying first vessel (2) and a calcining second vessel (4),
    each of the at least two vessels (2,4) being able to operate under a vacuum,
    the drying first vessel (2) being able to dry incoming waste and the calcining second vessel (4) being able to perform calcination treatment of dried waste from the first vessel (2),
    a first external heating system comprising a first combustion chamber (3) that external heats the drying first vessel (2), first external heating system being external to the drying first vessel (2),
    a second external heating system comprising a second combustion chamber (5) that external heats the calcining second vessel (4), the second external heating system being external to the calcining second vessel (4), a first extraction pipe (13) connected to the drying first vessel (2), a second extraction pipe (14) connected to calcining second vessel (4), at least one vacuum pump (15,16) connected by the first and second extraction pipes to the at least two vessels (2, 4), the at least one vacuum pump (15, 16) operative to maintain the vacuum in the at least two vessels (2,4), and at least one circulating pipe (12) connected to a discharge side of said at least one vacuum pump (15, 16) and passing through second combustion chamber (5) that external heats the calcining second vessel (4), the at least one circulating pipe (12) having a form of a coil within the second combustion chamber (5), wherein the second extraction pipe (14) is connected, via said at least one vacuum pump (15, 16), to the at least one circulating pipe (12) for circulating gas from the calcining second vessel (4) back to the calcining second vessel (4) through the second combustion chamber (5) of the second external heating system for external heating (5) of the calcining second vessel (4), the at least one circulating pipe (12) comprising multiple outlet apertures in the second calcining vessel (4).

21. The installation (22) according to claim 20, wherein the second combustion chamber (5) comprises a wall forming a double shell surrounding the second calcining vessel (4), the at least one circulating pipe (12) running within the double shell.

* * * * *